US010205835B1

(12) United States Patent
Zizzo et al.

(10) Patent No.: US 10,205,835 B1
(45) Date of Patent: Feb. 12, 2019

(54) PHOTOGRAPH CROPPING USING FACIAL DETECTION (71) Applicant: WALGREEN CO., Deerfield, IL (US)

(72) Inventors: Joseph Zizzo, Deerfield, IL (US); Benjamin Weiss, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

(21) Appl. No.: 15/729,279

(22) Filed: Oct. 10, 2017

Related U.S. Application Data (60) Provisional application No. 62/406,312, filed on Oct. 10, 2016.

(51) Int. Cl.
| | |
|---|---|
| *H04N 1/00* | (2006.01) |
| *G06K 9/00* | (2006.01) |
| *G06T 3/40* | (2006.01) |

(52) U.S. Cl.
CPC ..... *H04N 1/00167* (2013.01); *G06K 9/00228* (2013.01); *G06T 3/40* (2013.01); *H04N 1/00137* (2013.01); *H04N 1/00161* (2013.01); *H04N 1/00188* (2013.01); *H04N 1/00244* (2013.01); *G06T 2200/24* (2013.01); *G06T 2210/22* (2013.01)

(58) Field of Classification Search
None
See application file for complete search history.

(56) References Cited

U.S. PATENT DOCUMENTS

| | | | |
|---|---|---|---|
| 9,866,749 B2 * | 1/2018 | Relf | H04N 5/23222 |
| 2011/0254972 A1 * | 10/2011 | Yaguchi | H04N 5/23219 |
| | | | 348/222.1 |
| 2013/0108122 A1 * | 5/2013 | Ptucha | G06T 11/00 |
| | | | 382/118 |

* cited by examiner

*Primary Examiner* — Thomas D Lee
(74) *Attorney, Agent, or Firm* — Marshall, Gerstein & Borun LLP; Randall G. Rueth (57) ABSTRACT

Methods and systems for preventing the cropping of faces depicted by digital photographs are provided. To this end, the methods and systems may automatically detect the presence of faces depicted by the digital photographs and generate a facial boundary for the faces. The methods and system may also generate a crop boundary at which the photograph is cropped. In some scenarios, the systems and methods attempt to locate the crop boundary on the digital photograph to prevent omitting a portion of the facial boundary. Additionally or alternatively, users are provided an interface to manually set a location for the crop boundary. The user is warned if the crop boundary omits a portion of the facial boundary. The digital photographs and crop boundaries are sent to a printer to generate a physical print of the digital photographs.

16 Claims, 6 Drawing Sheets

PHOTOGRAPH CROPPING USING FACIAL DETECTION

CROSS-REFERENCE TO RELATED APPLICATIONS

This application claims the benefit of U.S. Provisional Patent Application No. 62/406,312, entitled "PHOTOGRAPH CROPPING USING FACIAL DETECTION," filed on Oct. 10, 2016, the disclosure of which is hereby incorporated herein by reference.

FIELD OF THE DISCLOSURE

The present disclosure generally relates to cropping photographs, and, more particularly, to using facial recognition to avoid cropping faces.

BACKGROUND

Currently, there are many tools that enable consumers to upload their digital photographs for creating a physical print. However, the aspect ratios associated with digital photographs generally do not align with the traditional sizes of physical prints (e.g., 4×6, 5×7, etc.). Accordingly, the digital photograph must be cropped to fit on a traditionally sized physical print. When this cropping process crops off portions of a face included in the digital photograph, there is an increased chance that the consumer will return the physical print and/or be unsatisfied with the printing tool. In view of this challenge, there is an opportunity to improve the photograph cropping process to reduce the likelihood that faces are cropped out of a physical print.

SUMMARY

In one aspect, a method for enabling a user to modify photograph croppings via an application executing on an electronic device is provided. The electronic device may include one or more processors and a memory coupled to the one or more processors. The method may include (1) causing the one or more processors to display a photograph selection interface in the application executing on the electronic device; (2) receiving, via the photograph selection interface, the selection of digital photographs; (3) the application causing the one or more processors to analyze the selection of digital photographs to determine the presence of a face within each digital photograph; (4) causing the one or more processors to display a photograph cropping interface in the application executing on the electronic device, the photograph cropping interface enabling a user to position a crop for digital photograph, wherein the photograph cropping interface includes (i) a facial boundary indicating a location of a face within a digital photograph, and (ii) a crop boundary indicating a location at which a digital photograph will be cropped; (5) the application causing the one or more processors to detect that the crop boundary omits a portion of the facial boundary; (6) the application causing the photograph cropping interface indicate that a face will be cropped by the crop; and (7) the application causing the one or more processors to transmit from the electronic device, over a communications network to an photograph server, the selection of digital photographs and corresponding crops for the selection of digital photographs, wherein the transmission of the selection of digital photographs and the corresponding crops causes a printer to create a physical print of the selection of digital photographs in accordance with the corresponding crops.

In another aspect, a computer-implemented method for detecting facial cropping is provided. The method may include (1) receiving, via a communications network and from an electronic device, a selection of digital photographs; (2) analyzing, by one or more processors, the selection of digital photographs to determine whether a face is present in one or more of the selection of digital photographs; (3) for each digital photograph in which a face is present (i) generating, by the one or more processors, a facial boundary for each face within the digital photograph, the facial boundary indicative of a location within the digital photograph representative of a face, (ii) generating, by the one or more processors, a crop boundary indicative of a location at which the digital photograph will be cropped, and (iii) attempting, by the one or more processors, to position the crop boundary on the digital photograph such that no portion of a facial boundary is omitted by the crop boundary; and (4) transmitting, to a printer, the selection of digital photographs and corresponding crop boundaries for the selection of digital photographs, wherein the transmission causes the printer to create a physical print of the selection of digital photographs in accordance with the corresponding crop boundaries.

In yet another aspect, a system for detecting facial cropping is provided. The system may include (i) one or more transceivers; (ii) one or more processors; and (iii) one or more non-transitory memories coupled to the one or more processors, wherein the one or more non-transitory memories include computer executable instructions stored therein that, when executed by the one or more processors, cause the system to (1) receive, via the one or more transceivers, a selection of digital photographs; (2) analyze the selection of digital photographs to determine whether a face is present in one or more of the selection of digital photographs; (3) for each digital photograph in which a face is present (i) generate a facial boundary for each face within the digital photograph, the facial boundary indicative of a location within the digital photograph representative of a face, (ii) generate a crop boundary indicative of a location at which the digital photograph will be cropped, and (iii) attempt to position the crop boundary on the digital photograph such that no portion of a facial boundary is omitted by the crop boundary; and (4) transmit, to a printer via the one or more transceivers, the selection of digital photographs and corresponding crop boundaries for the selection of digital photographs, wherein the transmission causes the printer to create a physical print of the selection of digital photographs in accordance with the corresponding crop boundaries.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

The Figures depict embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, detecting that a photograph uploaded to a photograph server depicts a face, automatically generating a proposed crop for the photograph, alerting a user that a crop may crop out a portion a face within the photograph, providing an interface to manually set a crop of a photograph wherein the interface alerts the user as to when a face is cropped, and/or printing the photograph after setting an appropriate crop. The present embodiments may further include maintaining a photograph database interconnected to a photograph server that stores a plurality of photographs a user has uploaded. The database may be organized by user profile and organize the photographs within a user profile by date of upload, device from which the photographs were uploaded, or any other manner photographs may be organized.

In an aspect, users may access the photograph server via a user interface. In some embodiments, the user interface may be provided via an application executing on a mobile device (e.g., smart phone). In these embodiments the application may be distributed via an app store and/or a hosted download server. In other embodiments, the user interface may be provided through a website and accessed through an internet browser of an electronic device. Regardless of how the user interface is provided, the user interface may enable the user to upload digital photographs stored on an electronic device to the photograph server. In some embodiments, the mobile device automatically uploads the digital photographs to the photograph server upon capture.

The user interface may further enable the user to select a portion of the digital photographs uploaded to the server for printing. For example, the user interface may enable the user to browse through all photographs stored in the photograph database associated the user's profile and select individual digital photographs and/or groupings (e.g., folders) of digital photographs for printing. In some embodiments, the selection of digital photographs may include digital photographs stored locally on the electronic device that will be uploaded to the photograph server after selection.

In an aspect, upon receiving the selection of digital photographs for printing, the photograph server may execute a facial detection algorithm on each selected digital photograph. If a digital photograph includes one or more faces, the facial detection algorithm may generate a facial boundary individually encompassing each of the one or more faces. After the facial boundaries are generated, the photograph server may generate a proposed crop to avoid cropping out a portion of a face. In some embodiments, the proposed crops may be sent to the electronic device of the user for approval prior to printing. If any of the proposed crops include a portion of a face being cropped, the user interface may warn the user as to the possibility of cropping out a face. After the user approves the proposed crops, the digital photographs may be sent to a printer for printing.

In another aspect, the electronic device may provide an interface for manually setting a crop boundary for the digital photographs. The interface may depict the digital photographs as well as the facial boundaries generated by the facial detection algorithm. The interface may further depict a crop box indicative of the size of a crop that will be used for the physical print. Accordingly, the interface may enable a user to position the crop box on the digital photograph to manually set the bounds of the cropping. If the crop box omits a portion of one of the facial boundaries, the interface may alert the user that the current position of the crop box will result in a face being cropped and that the user should move the crop box. This alert may automatically disappear if the user subsequently repositions the crop box to avoid omitting any portion of a facial boundary.

In another aspect, the facial detection algorithm may generate facial boundaries that are larger than necessary to prevent a face from being cropped. As an example, when a person's head is turned towards the side, the corresponding facial boundary may include a portion of the head in addition to the person's face. As another example, the facial boundary may include some of the person's hear above their face. In these examples, it may be possible to reduce the size of a facial boundary while still preventing a face from being cropped. Accordingly, the facial detection algorithm may include additional processing to reduce the size of facial boundaries to prevent warning a user when such a warning is not necessary.

Additionally, although the term "box" is occasionally used herein to refer to a facial boundary and/or a crop boundary, the term "box" is not meant to refer to a rectangular shape. Rather, the term box may refer to an enclosed region of any shape. For example, some facial detection algorithms may generate a facial boundary that roughly corresponds to the shape of a face. As another example, some photograph printers may be capable of generating prints in a round or ovular shape. Accordingly, as it is generally used herein, the term "box" encompasses these alternative shapes.

It should be appreciated that although the present disclosure generally refers to the facial detection algorithm being performed at a photograph server, it is envisioned that the application executing on the electronic device is also capable of executing the facial detection algorithm. For example, a smart phone operating system may include a standard API for detecting faces in a digital photograph. Thus, in some embodiments, the electronic device may attempt to automatically crop the digital photographs, provide an interface to modify a crop proposal, and generate a modified crop proposal prior to uploading a digital photograph to the photograph server. In these embodiments, the uploading step and the transmission of a modified crop proposal may occur concurrently. Accordingly, any reference to the facial detection algorithm (or other photograph processing) being performed at the photograph server also envisions the additional or alternative performance at the electronic device.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

I. Example Environment

Figure 1:
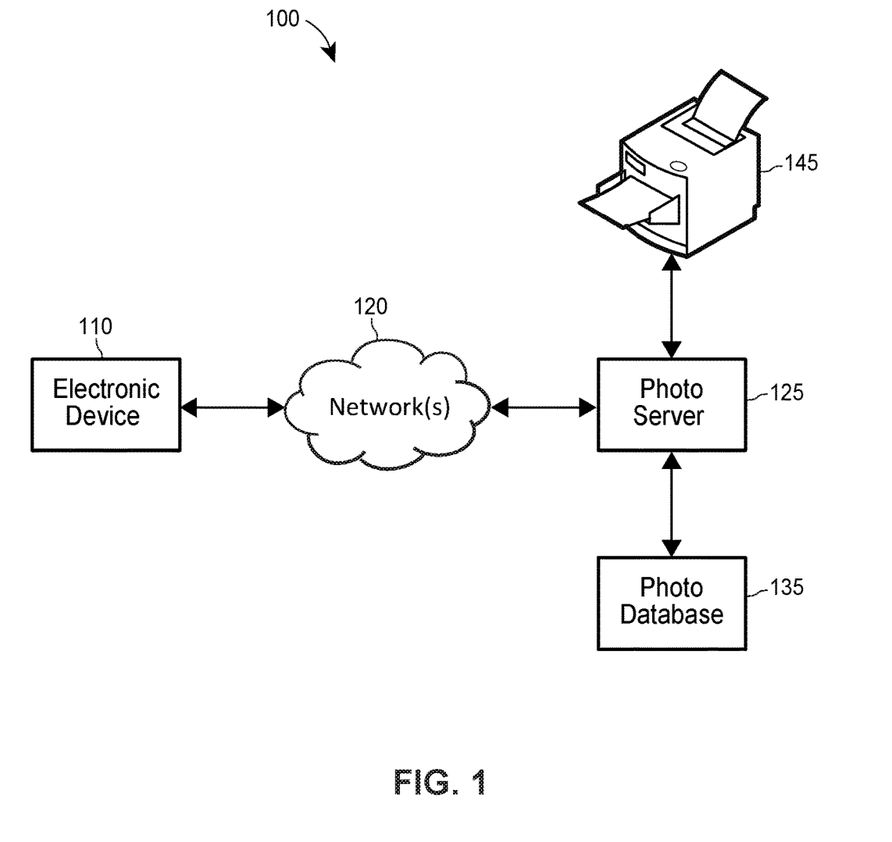
FIG. 1 depicts an example environment including components and entities associated with a digital photograph printing, in accordance with some embodiments.

FIG. 1 illustrates an example environment 100 associated with digital photograph printing. Although FIG. 1 depicts certain entities, components, and devices, it should be appreciated that additional or alternate entities and components are envisioned.

As illustrated in FIG. 1, the environment 100 may include an electronic device 110. The electronic device 110 may be any electronic device, such as a smart phone, a desktop computer, a laptop, a tablet, a phablet, a smart watch, smart glasses, wearable electronics, pager, personal digital assistant, and/or any other electronic device, including computing devices configured for wireless radio frequency (RF) communication. The electronic device 110 may store one or more digital photographs in a memory therein. In some embodiments, the electronic device 110 may further include a camera or other digital image capturing capability.

In an embodiment, the electronic device 110 may store machine-readable code representative of a photograph printing application stored on a memory therein. As part of the process to print the one or more digital photographs stored on the electronic device 110, the user may launch and/or execute the photograph printing application. As a result, the electronic device 110 may display an interface that guides the user through the process of uploading digital photographs, cropping digital photographs, and/or printing digital photographs. In some embodiments, the electronic device 110 may include a browser application that enables the user to navigate to a website to perform the functionality associated with the photograph printing application. Accordingly, any reference to the functionality of an application also envisions the alternative performance by a website via the browser application, and vice versa.

According to aspects, the application may enable the user of the electronic device 110 to manually set a crop for one or more digital photographs. To this end, the application may cause a digital photograph to be displayed on a display of the electronic device 110. In addition to the digital photograph itself, the application may also cause one or more facial boundary boxes and a crop box to be displayed on the display. According to aspects, the application may enable the user to position the crop box on the digital photograph, for example, by sliding a finger, clicking and dragging, or any other known user interface techniques moving a crop box on a display. The application may be configured to provide an alert to the user when the crop box omits a portion of a facial boundary in the crop.

According to present embodiments, the electronic device 110 communicate with a photograph server 125 via a network 120. The network 120 may facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). In some embodiments, the electronic device 110 may transmit data representative of digital photographs to the photograph server 125 for printing and/or storage. In some embodiments, the digital photographs may have previously been uploaded to the photograph server 125. Accordingly, the electronic device 110 may additionally or alternatively transmit a selection of digital photographs previously uploaded to the photograph server 125. In aspects, the electronic device 110 may also transmit manual croppings to the photograph server 125 for use when printing the digital photographs.

According to embodiments, the photograph server 125 may be coupled to a photograph database 135 that may store data representative of a plurality of digital photographs that user of the electronic device 110 has uploaded to the photograph server 125. Although FIG. 1 depicts the photograph database 135 as coupled to the photograph server 125, it is envisioned that the photograph database 135 may be maintained in the "cloud" such that any element of the environment 100 capable of communicating over the network 120 may directly interact with the photograph database 135. In some embodiments, the photograph database 135 may be stored in a memory component of the photograph server 125.

The photograph server 125 may analyze one or more digital photographs that the user of the electronic device 110 has selected and/or uploaded for printing. The photograph server 125 may then execute a facial detection algorithm on the digital photographs to determine whether the one or more digital photographs include any faces, and if so, generate a facial boundary for each face. The photograph server 125 may then attempt to automatically crop the one or more digital photographs using an indicated physical photograph size and/or a default physical photograph size. To this end, the photograph server 125 may generate a crop box and attempt to position the crop box such that no portion of the facial boundaries are omitted from the cropped digital photograph. This automatically generated position of the crop box may be referred to as a crop proposal. The photograph server 125 may then transmit, via the network(s) 120, the crop proposals to the electronic device 110 for approval. In addition, if the photograph server 125 was unable to automatically generate a crop proposal that does not omit a portion of a facial boundary, the photograph server 125 may also transmit, via the network(s) 120, a warning to the user. At some point after transmitting the crop proposals, the photograph sever 125 may receive a modification to one or more crop proposals and/or an approval to print the digital photographs in accordance with the original or user-modified crop proposals.

As shown in the environment 100, the photograph server 125 may be communicatively connected with a printer 145. The printer 145 may be any printer that is capable of printing a physical photograph based upon received digital photograph data. According to aspects, the photograph server 125 may crop the digital photographs in accordance with the original or user-modified crop proposals. The photograph server 125 may then transmit the cropped digital photographs to the printer 145. After receiving the cropped digital photographs, the printer 145 may generate a physical photograph for each of the received cropped digital photographs.

II. Example Facial Cropping Avoidance

Figure 2:
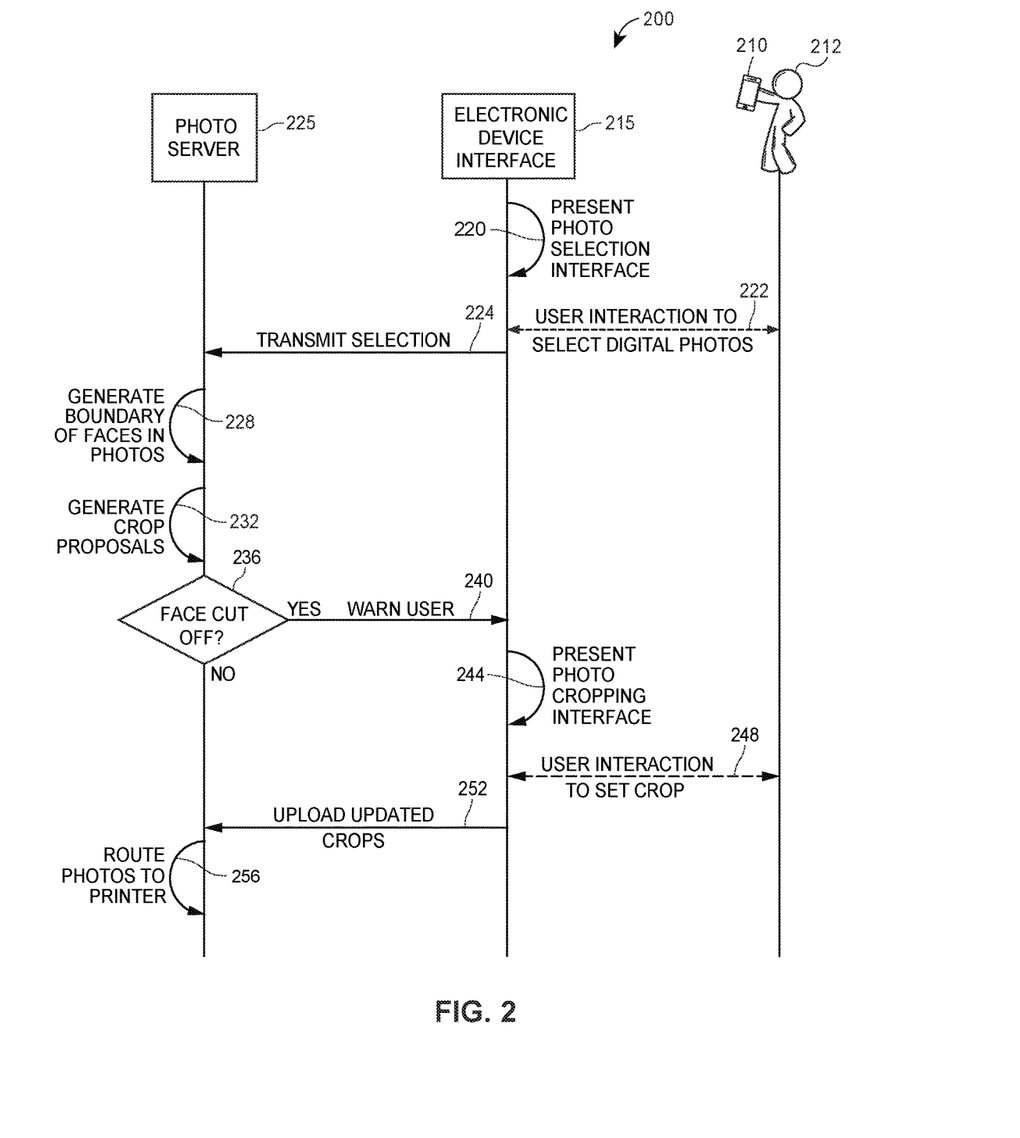
FIG. 2 depicts an example signal diagram associated with the depicted components of FIG. 1, for printing photographs such that facial cropping is avoided, in accordance with some embodiments.

Referring to FIG. 2, illustrated is a signal diagram 200 associated with printing photographs such that facial cropping is avoided. In particular, FIG. 2 includes a photograph server 225 (such as the photograph server 125 as described with respect to FIG. 1), electronic device user interfaces 215, and a user 212 associated with an electronic device 210 (such as the electronic device 110 as described with respect to FIG. 1). It should be appreciated that the electronic device 210 may comprise any type of electronic device. Although only the electronic device 210 is depicted in FIG. 2, it should be appreciated that the photograph server 225 may communicate with a plurality of electronic devices to avoid facial cropping for a plurality of selections of digital photographs corresponding to a plurality of users of electronic devices.

The signal diagram 200 may begin when the electronic device 210 presents (220) a photograph selection interface on the electronic device 210. The user 212 may then interact (222) with the photograph selection interface 215 to select one or more digital photographs. After the user 212 selects the one or more digital photographs, the electronic device 215 may transmit (224) the selection of digital photographs to the photograph server 225.

In response, the photograph server 225 may determine whether the selection of digital photographs includes a digital photograph that depicts a face by executing a facial detection algorithm. When a digital photograph does depict a face, the facial detection algorithm may generate (228) a facial boundary corresponding to each face. The photograph server 225 may also generate (232) and/or automatically position a crop boundary indicative of a location at which the digital photograph will be cropped. After the crop boundary is positioned on the digital photograph, the photograph server may determine (decision 236) whether a facial boundary cut off, e.g., whether the crop boundary omits a portion of a facial boundary. According to aspects, if no facial boundaries are cut off ("NO") the photograph server may route (256) the selected digital photographs and/or automatically generated crop boundary and positioning data to a printer to create a physical print.

On the other hand, if a facial boundary is cut off by the crop boundary ("YES"), the photograph server 225 may transmit (240) a warning to the electronic device 210. In response to the warning, the electronic device 210 may generate and present (244) a photograph cropping interface 215 to the user 212. The photograph cropping interface 215 may enable the user 212 to manually position the crop boundary and/or change the dimensions of the crop boundary. Accordingly, the photograph cropping interface 215 may monitor one or more user interactions (248) to detect that the user has updated the crop boundary information. When the user 212 is finished interacting with the photograph cropping interface 215 to set the crop boundaries, the electronic device 210 may transmit (252) the updated crop boundaries to the photograph server 225. The photograph server may then route (256) the selected digital photographs and/or updated user-indicated crop boundaries to the printer to create a physical print. The signal diagram 200 may include additional, fewer, or alternate actions, including those discussed elsewhere herein.

III. Example User Interfaces

An electronic device (such as the electronic device 110 as described with respect to FIG. 1) may provide a user interface that enables an user to manually position a crop box on a digital photograph. The interfaces may be provided as part of a photograph printing application that is executed on the electronic device.

Figure 3A:
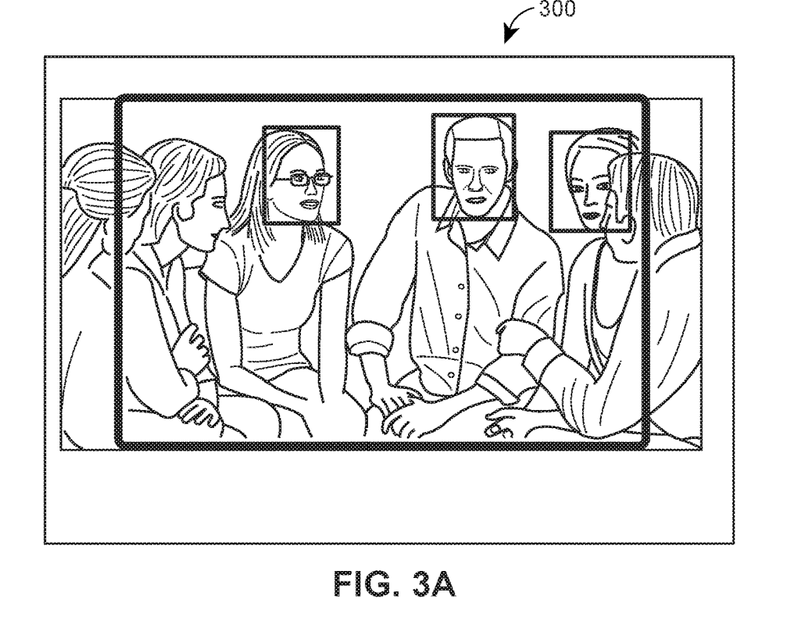
FIG. 3A depicts an exemplary interface displayable by an electronic device, such as the electronic device of FIG. 1, for providing a manual cropping interface for avoiding facial cropping, in accordance with some embodiments.
Figure 3B:
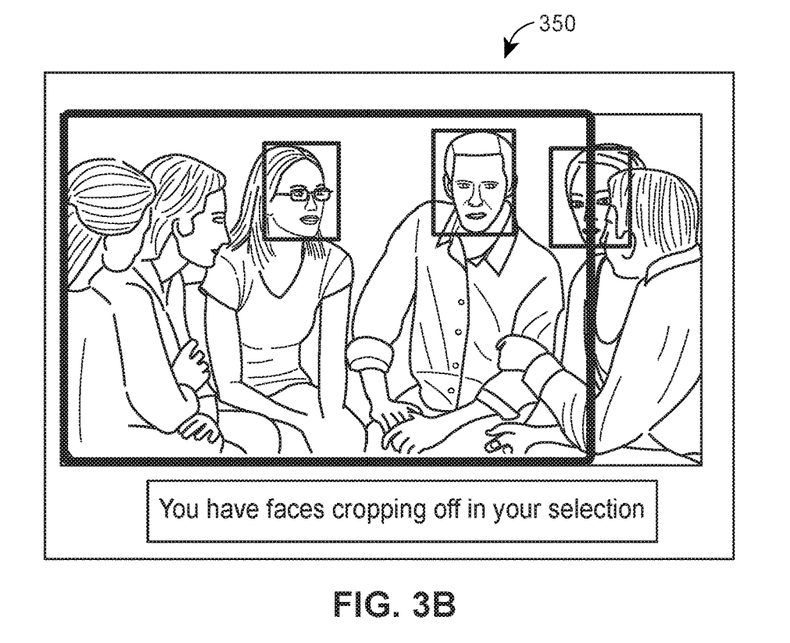
FIG. 3B depicts an exemplary interface displayable by an electronic device, such as the electronic device of FIG. 1, for providing a manual cropping interface for avoiding facial cropping, in accordance with some embodiments.

FIGS. 3A and 3B illustrate example interfaces 300 and 350, respectively, that may be displayed by the electronic device. The interfaces 300 and 350 may display a digital photograph that is to be cropped to generate a physical print. The interface 300 may include a crop box (the thickly-lined box) that represents the physical dimensions of a physical photograph that will be printed. To this end, only the portion of the digital photograph within the crop box will be printed when the digital photograph is sent to a printer. The interfaces 300 and 350 may also include one or more facial boundary boxes (the thinly-lined boxes) generated by a facial detection algorithm. The facial boundary boxes may represent a location within the digital photograph that corresponds to digital data indicative of a face.

According to aspects, a user of the electronic device may interact with the interfaces 300 and 350 to reposition the crop box on the digital photograph. To this end, the interface 350 may be described as the resulting interface if the user of the electronic device repositioned the crop box of the interface 300 further to the left. To this end, the interfaces 300 and 350 may be configured to receive any type of user input capable of indicating that the crop box should be repositioned on the digital photograph. For example, the user input may be a slide of the finger, a drag of a mouse, a verbal command (e.g., "arrange center"), a gesture, a tilt or rotation of the electronic device, or any other known user input capable of being interpreted to reposition a crop box on a digital photograph.

According to aspects, the interfaces 300 and 350 may be configured to dynamically compare the relative positions of the crop box and the one or more facial boundary boxes. In particular, the interfaces 300 and 350 may determine whether the crop box omits any portion of the one or more facial boundary boxes. The interface 350 depicts an example scenario where the crop box does, in fact, omit a portion of the one or more facial boundary boxes. Accordingly, as depicted in FIG. 3B, the interface 350 may include a warning that the current position of the crop box omits a portion of the one or more facial boundary boxes ("You haves faces cropping off in your selection"). Although the interface 350 depicts a textual warning, the interface 350 may additionally or alternatively generate other types of warnings. For example, the warning may be an warning tone, a speech output, a haptic feedback, a visual cue (e.g., the digital photograph "shaking") or any other type of warning indicative that the current crop box position will crop off a face in the digital photograph.

According to aspects, when the user interacts with the interface 350 to reposition the crop box to the position indicated in the interface 300 (i.e., a position where the one or more facial boundary boxes are contained within the crop box), any visual warnings presented to the user may be removed. In some embodiments, the interfaces 300 or 350 may additionally or alternatively generate positive feedback to the user whenever the crop box does not omit a portion of the one or more facial boundary boxes. For example, the positive feedback may include outlining the digital photograph in green, depicting a check box, or any other type of positive feedback indicative that the current crop box position includes all of the facial boundary boxes. Of course, the interfaces 300 and 350 are merely one example of how an interface may be implemented. Other interfaces may be implemented without departing from the spirit of the present disclosure.

IV. Example Methods of Avoiding Facial Cropping

Figure 4:
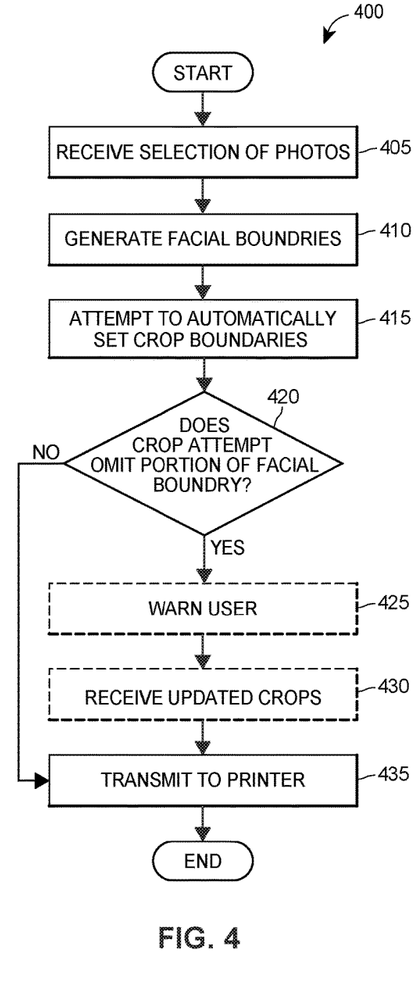
FIG. 4 depicts a flow diagram associated with a photograph server, such as the photograph server of FIG. 1, for printing photographs such that facial cropping is avoided, in accordance with some embodiments.

Referring to FIG. 4, illustrated is a block diagram of an exemplary method 400 for automatically generating crop boundaries that do not omit a portion of a facial boundary. The method 400 may be facilitated by an photograph server (such as the photograph server 125 as described with respect to FIG. 1) communicatively coupled to a printer (such as printer 145 as described with respect to FIG. 1).

To begin the method 400, the photograph server may receive a selection of digital photographs (block 405). In some embodiments, the selection of digital photographs indicate a selection of digital photographs that a user of an electronic device has indicated should be printed. In some scenarios, the selection of digital photographs may occur by uploading the digital photographs to the photograph server. Additionally or alternatively, the selection of digital photographs may include a selection of digital photographs stored in a database communicatively coupled to the photograph server (such as the photograph database 135 as described with respect to FIG. 1).

According to aspects, the photograph server may then analyze the selected photographs to determine whether a face is present in any of the digital photographs. To this end, the photograph server may execute any known facial detection algorithm to determine the presence of a face. If the facial detection algorithm indicates that a face is present within a digital photograph, the photograph server may automatically generate facial boundaries indicative of locations within the digital photograph representative of a face (block 415). For example, the facial boundary may be a box or other shape that encompasses the detected face. In addition to the facial boundaries, the photograph server may generate a crop boundary indicative of a location at which the digital photograph will be cropped (block 420). According to aspects, the crop boundary may represent a default print size of a photograph or a user-indicated print size of a photograph.

According to aspects, the photograph server may then attempt to position the crop boundary on the digital photographs such that no portion of the facial boundary is omitted from the crop. To this end, the photograph server may compare the size and relative positions of the facial boundaries to generate a solution where the crop box may be positioned to include the entirety of each of the facial boundaries. It should be appreciated that this process is referred to as an "attempt," as there are some digital photographs in which no solutions exist that do not omit a portion of a facial boundary. Accordingly, the photograph server may then analyze the output of the attempt to determine whether any attempt to position the crop boundary still omits a portion of a facial boundary (block 420). If no crop boundaries omit a portion of any facial boundaries ("NO"), the selection of digital photographs may be transmitted to a printer for printing in accordance with the crop boundaries (Block 435).

On the other hand, if a crop boundary does omit a portion of a facial boundary ("YES"), the photograph server may transmit a warning to the electronic device of the user indicating that a face may be cropped off if the digital photograph is printed (Block 425). Accordingly the electronic device may provide an interface that enables the user to manually-set a desired crop boundary and/or change a size (or shape) of the crop boundary. After the user interaction with the interface, the photograph server may receive updated crop information including the user-indicated crop boundary as generated by interacting with the interface (Block 430). Upon receiving any user-indicated crop boundaries, the photograph server may then transmit the selection of digital photographs to the printer for printing in accordance with the user-indicated crop boundaries. It should be appreciated that the method 400 may include additional, fewer, or alternate actions, including those discussed elsewhere herein.

Figure 5:
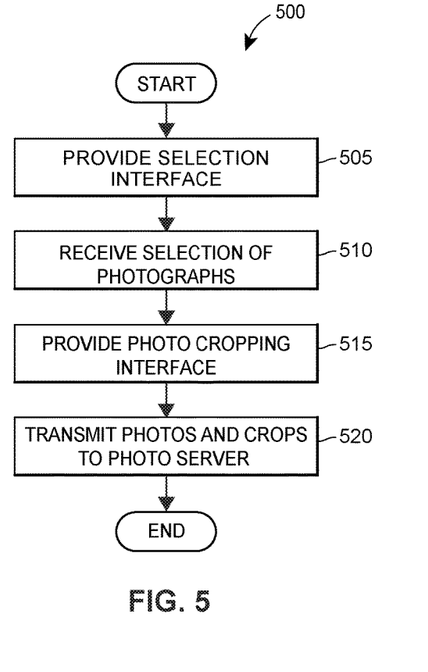
FIG. 5 depicts a flow diagram associated with a mobile device, such as the mobile device of FIG. 1, for printing photographs such that facial cropping is avoided, in accordance with some embodiments.

Referring now to FIG. 5, illustrated is a block diagram of an exemplary method 500 for providing an interface to enable a user to modify photograph cropping to avoid facial cropping. The method 500 may be facilitated by an application (such as a photograph printing application) running on an electronic device (such as the electronic device 110 as described with respect to FIG. 1).

The method 500 may begin when the application causes the electronic device to display an interface for selecting one or more digital photographs (Block 505). The interface may enable the user to select one or more digital photographs stored on the electronic device and/or one or more digital photographs stored at a photograph server (such as the photograph server 125 as described with respect to FIG. 1) (Block 510).

According to aspects, the application may then present a photograph cropping interface that enables the user to manually crop the selected digital photographs (Block 515). For example, the photograph cropping interface may be the interfaces 300 or 350 respectively described with reference to FIGS. 3A and 3B. The photograph cropping interface may enable the user to visually see a facial boundary of any face within the digital photograph and a crop boundary indicative of where the digital photograph will be cropped. As described elsewhere herein, the photo cropping interface may enable the user to manually position the crop box within the digital photograph. Accordingly, the photo cropping interface may monitor the relative positions of the facial boundary and the crop boundary to detect whether any portion of the facial boundary is omitted from the crop. When the crop boundary does omit a portion of the facial boundary, the photograph cropping application may warn the user that the current cropping may crop out a portion of a face.

After the user is satisfied with manually cropping the selection of digital photographs, the user may interact with the photograph cropping interface to transmit digital photographs to the photograph server and/or a corresponding crop boundary (Block 520). Upon receiving the transmission of the selection of digital photographs and/or corresponding crop boundaries, the photograph server may route the received digital photographs and/or crop boundaries to a printer to create a physical print in accordance with the corresponding crops boundaries. It should be appreciated that the method 500 may include additional, fewer, or alternate actions, including those discussed elsewhere herein.

VI. Example Electronic Device

Figure 6:
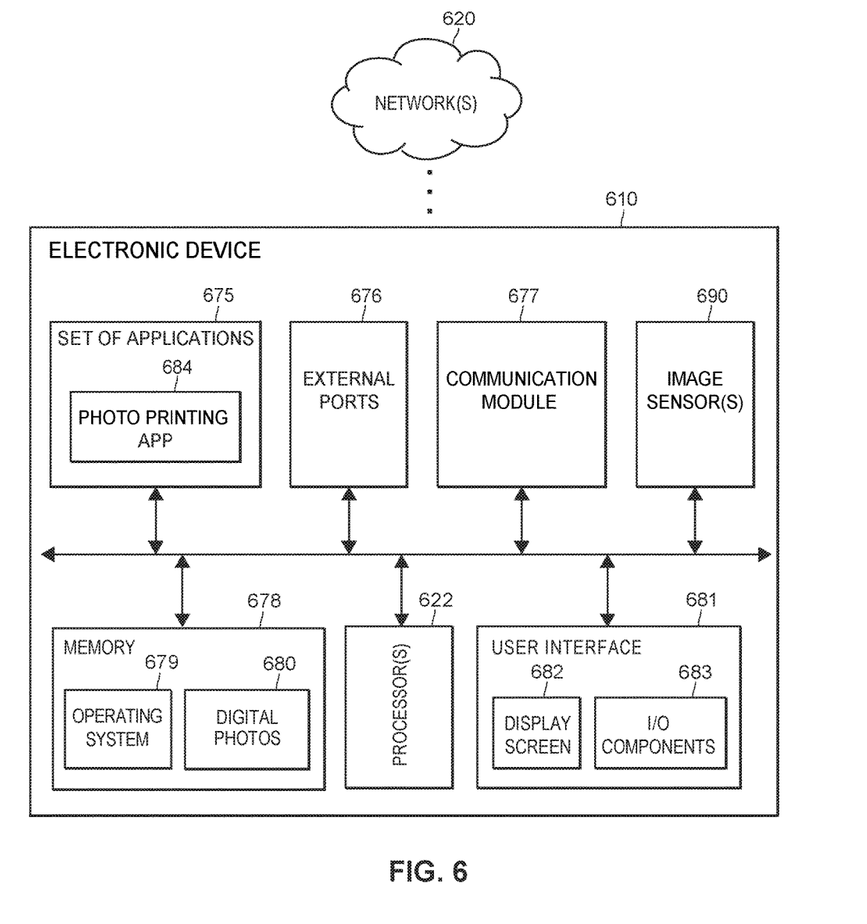
FIG. 6 is a block diagram of an example electronic device, such as the electronic device of FIG. 1, in accordance with some embodiments.

FIG. 6 illustrates a diagram of an exemplary electronic device 610 (such as the electronic device 110 as discussed with respect to FIG. 1) in which the functionalities as discussed herein may be implemented. It should be appreciated that the electronic device 610 may be associated with an user, as discussed herein.

The electronic device 610 may include one or more processors 622 as well as a memory 678. The memory 678 may store an operating system 679 capable of facilitating the functionalities as described herein. The memory 678 may further store one or more digital photographs 680, including digital photographs that have been captured by one or more image sensors 690. The electronic device 610 may also store a set of applications 675 (i.e., machine readable instructions). For example, one of the set of applications 675 may be a photograph printing application 684 configured to direct the user through the process of printing a digital photograph, including the process of cropping the digital photograph to a physical photograph size. It should be appreciated that electronic device 610 may include any number of other applications.

The one or more processors 622 may interface with the memory 678 to execute the operating system 679 and the set of applications 675. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 610 may further include a communication module 677 configured to communicate data via one or more networks 620. According to some embodiments, the communication module 677 can include one or more transceivers (e.g., WWAN, WLAN, and/or WPAN transceivers) functioning in accordance with IEEE standards, 3GPP standards, or other standards, and configured to receive and transmit data via one or more external ports 676. For example, the communication module 677 may send, via the network 620, image data representative one or more digital photographs, modifications to crop proposals, and/or approvals to print the digital photographs. The electronic device 610 may further include a user interface 681 configured to present information to the user and/or receive inputs from the user. As shown in FIG. 6, the user interface 681 may include a display screen 682 and/or I/O components 683 (e.g., ports, capacitive or resistive touch sensitive input panels, keys, buttons, lights, LEDs, speakers, microphones). According to the present embodiments, the user may access the electronic device 610 via the user interface 681 to upload digital photographs, manually set a crop box position on a digital photograph, and/or perform other functions. In some embodiments, the electronic device 610 may perform the functionalities as discussed herein as part of a "cloud" network or can otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 622 (e.g., working in connection with the operating system 679) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, Javascript, CSS, XML). In some embodiments, the computer program product may be part of a cloud network of resources.

VII. Example Photograph Server

Figure 7:
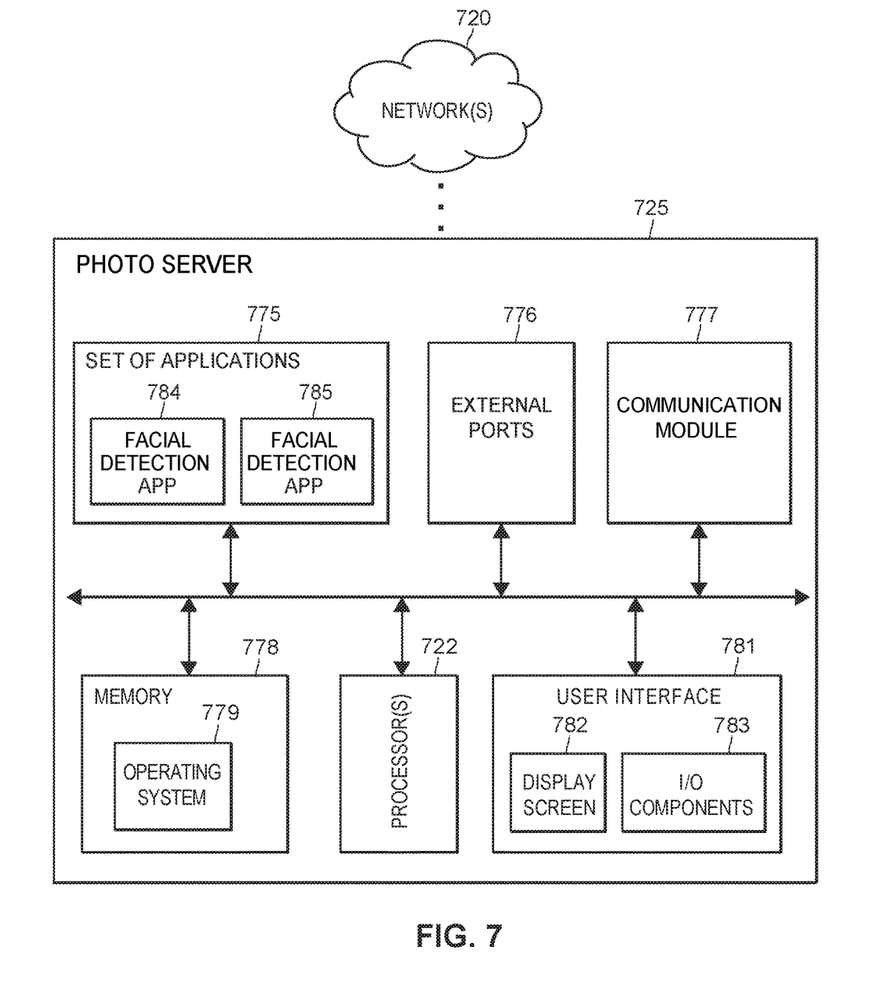
FIG. 7 is a block diagram of an example photograph server, such as the photograph server of FIG. 1, in accordance with some embodiments.

FIG. 7 illustrates a diagram of an exemplary photograph server 725 (such as the photograph server 125 as discussed with respect to FIG. 1) in which the functionalities as discussed herein may be implemented.

The photograph server 725 may include one or more processors 722 as well as a memory 778. The memory 778 may store an operating system 779 capable of facilitating the functionalities as described herein. The photograph server 725 may also store a set of applications 775 (i.e., machine readable instructions). For example, one of the set of applications 775 may be an facial detection application 784 configured to generate one or more facial boundary boxes on a digital photograph and/or a photo crop application to automatically position a crop box on a digital photograph. It should be appreciated that other applications are also envisioned.

The one or more processors 722 may interface with the memory 778 to execute the operating system 779 and the set of applications 775. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The photograph server 725 may further include a communication module 777 configured to communicate data via one or more networks 720. According to some embodiments, the communication module 777 can include one or more transceivers (e.g., WWAN, WLAN, and/or WPAN transceivers) functioning in accordance with IEEE standards, 3GPP standards, or other standards, and configured to receive and transmit data via one or more external ports 776. For example, the communication module 777 may receive, via the network 720, one or more digital photographs and/or transmit one or more digital photographs to a printer for printing. The photograph server 725 may further include a user interface 781 configured to present information to the user and/or receive inputs from the user. As shown in FIG. 7, the user interface 781 may include a display screen 782 and/or I/O components 783 (e.g., ports, capacitive or resistive touch sensitive input panels, keys, buttons, lights, LEDs, speakers, microphones). According to the present embodiments, the user may access the photograph server 725 via the user interface 781 to update the operating system 779 and/or perform other functions. In some embodiments, the photograph server 725 may perform the functionalities as discussed herein as part of a "cloud" network or can otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 722 (e.g., working in connection with the operating system 779) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, Javascript, CSS, XML). In some embodiments, the computer program product may be part of a cloud network of resources.

VIII. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

What is claimed:

1. A method for enabling a user to modify photograph croppings via an application executing on an electronic device, wherein the electronic device includes one or more processors and a memory coupled to the one or more processors, the method comprising:
   causing the one or more processors to display a photograph selection interface in the application executing on the electronic device;
   receiving, via the photograph selection interface, the selection of digital photographs;
   the application causing the one or more processors to analyze the selection of digital photographs to determine the presence of a face within each digital photograph;
   causing the one or more processors to display a photograph cropping interface in the application executing on the electronic device, the photograph cropping interface enabling a user to position a crop for digital photographs, wherein the photograph cropping interface includes:
      a facial boundary indicating a location of a face within a digital photograph, and
      a crop boundary indicating a location at which a digital photograph will be cropped;
   the application causing the one or more processors to detect that the crop boundary omits a portion of the facial boundary;
   the application causing the photograph cropping interface indicate that a face will be cropped by the crop; and
   the application causing the one or more processors to transmit from the electronic device, over a communications network to an photograph server, the selection of digital photographs and corresponding crops for the selection of digital photographs, wherein the transmission of the selection of digital photographs and the corresponding crops causes a printer to create a physical print of the selection of digital photographs in accordance with the corresponding crops.

2. The method of claim 1, wherein transmitting the selection of digital photographs comprises:
   uploading, via a communication network, the digital photographs to a user profile stored at the photograph server, the user profile corresponding to a user of the electronic device.

3. The method of claim 1, wherein receiving the selection of digital photographs comprises:
   the application causing the one or more processors to access a user profile stored at the photograph server, the user profile corresponding to a user of the electronic device and storing a plurality of digital photographs.

4. The method of claim 1, wherein receiving the selection of digital photographs comprises:
   the application causing the one or more processors to access a plurality of digital photographs stored at the electronic device.

5. The method of claim 1, wherein the application is downloaded to the electronic device.

6. The method of claim 1, wherein the application is executed by a browser application executing on the electronic device.

7. The method of claim 1, further comprising:
   receiving, via the photograph cropping interface displayed by the application, an indication of at least one of a shape or a size of the crop box.

8. The method of claim 7, wherein causing the one or more processors to display the photograph cropping interface in the application comprises:
   causing the one or more processors to display the crop boundary in the at least one of the shape and the size included in the received indication.

9. The method of claim 1, further comprising:
   the application causing the one or more processors to detect a user input to move the location of the crop boundary;
   the application causing the one or more processors to detect that the crop boundary no longer omits the portion of the facial boundary;
   the application causing the photograph cropping interface to indicate that no faces will be cropped by the crop.

10. A computer-implemented method for detecting facial cropping, the method comprising:
    receiving, via a communications network and from an electronic device, a selection of digital photographs;
    analyzing, by one or more processors, the selection of digital photographs to determine whether a face is present in one or more of the selection of digital photographs;
    for each digital photograph in which a face is present:
       generating, by the one or more processors, a facial boundary for each face within the digital photograph, the facial boundary indicative of a location within the digital photograph representative of a face,
       generating, by the one or more processors, a crop boundary indicative of a location at which the digital photograph will be cropped, and
       attempting, by the one or more processors, to position the crop boundary on the digital photograph such that no portion of a facial boundary is omitted by the crop boundary;
    detecting, by the one or more processors, that the crop boundary generated for a particular digital photograph omits a portion of the facial boundary;
    transmitting, via the communications network and to the electronic device, a warning that a face depicted by the particular digital photograph is cropped;
    receiving, via the communications network and from the electronic device, an indication of a user-positioned crop boundary for the particular digital photograph; and
    transmitting, to a printer, the selection of digital photographs and corresponding crop boundaries for the selection of digital photographs, wherein the transmission causes the printer to create a physical print of the selection of digital photographs in accordance with the corresponding crop boundaries.

11. The method of claim 10, wherein receiving the selection of digital photographs comprises:
    receiving, via a communication network, digital photograph files storing data representative of the digital photographs.

12. The method of claim 11, further comprising:
    storing, by the one or more processors, the digital photograph files to a user profile corresponding to a user of the electronic device.

13. The method of claim 10, wherein receiving the selection of digital photographs comprises:
    receiving, via a communication network, a selection of digital photograph files stored at a user profile corresponding to a user of the electronic device.

14. The method of claim 10, wherein receiving the indication of the user-positioned crop boundary comprises:

receiving, via the communications network and from the electronic device, an indication of a crop boundary having a different size or shape than the generated crop boundary.

15. The method of claim 10, wherein transmitting, to the printer, the selection of the particular digital photograph and the corresponding crop boundary comprises:
transmitting, to a printer, the selection of the particular digital photograph and the user-positioned crop boundary.

16. A system for detecting facial cropping, the system comprising:
one or more transceivers;
one or more processors; and
one or more non-transitory memories coupled to the one or more processors,
wherein the one or more non-transitory memories include computer executable instructions stored therein that, when executed by the one or more processors, cause the system to:
receive, via the one or more transceivers, a selection of digital photographs;
analyze the selection of digital photographs to determine whether a face is present in one or more of the selection of digital photographs;
for each digital photograph in which a face is present:
generate a facial boundary for each face within the digital photograph, the facial boundary indicative of a location within the digital photograph representative of a face,
generate a crop boundary indicative of a location at which the digital photograph will be cropped, and
attempt to position the crop boundary on the digital photograph such that no portion of a facial boundary is omitted by the crop boundary;
detect that the crop boundary generated for a particular digital photograph omits a portion of the facial boundary;
transmit, via the one or more transceivers, a warning that a face depicted by the particular digital photograph is cropped; and
receive, via the one or more transceivers, an indication of a user-positioned crop boundary for the particular digital photograph; and
transmit, to a printer via the one or more transceivers, the selection of digital photographs and corresponding crop boundaries for the selection of digital photographs, wherein the transmission causes the printer to create a physical print of the selection of digital photographs in accordance with the corresponding crop boundaries.

* * * * *